(12) United States Patent
Nilsrud et al.

(10) Patent No.: US 7,093,873 B2
(45) Date of Patent: Aug. 22, 2006

(54) COLLAPSIBLE STORAGE APPARATUS FOR VEHICLE CARGO COMPARTMENTS

(75) Inventors: Öivind Nilsrud, Skara (SE); Per Erlandsson, Skara (SE); Ralph Steven Szejbach, Warren, MI (US)

(73) Assignee: Collins & Aikman Products Co., Troy, MI (US)

( * ) Notice: Subject to any disclaimer, the term of this patent is extended or adjusted under 35 U.S.C. 154(b) by 121 days.

(21) Appl. No.: 10/921,504

(22) Filed: Aug. 19, 2004

(65) Prior Publication Data
US 2006/0038423 A1 Feb. 23, 2006

(51) Int. Cl.
*B60N 99/00* (2006.01)
(52) U.S. Cl. .................. 296/37.14; 296/37.5; 296/37.8
(58) Field of Classification Search ............... 296/37.1, 296/37.5, 37.8, 37.14, 37.16, 24.3, 24
See application file for complete search history.

(56) References Cited

U.S. PATENT DOCUMENTS

| 5,626,380 A | * | 5/1997 | Elson et al. ............... 296/39.1 |
| 5,795,005 A | * | 8/1998 | Garfias et al. ............. 296/37.5 |
| 6,053,553 A | * | 4/2000 | Hespelt ...................... 296/37.1 |
| 6,253,943 B1 | * | 7/2001 | Spykerman et al. ........... 220/6 |
| 6,890,015 B1 | * | 5/2005 | Carlsson et al. ......... 296/37.14 |

* cited by examiner

Primary Examiner—Lori L. Coletta
(74) Attorney, Agent, or Firm—Myers Bigel Sibley & Sajovec

(57) ABSTRACT

Apparatus for storing items within a vehicle compartment that can be operated single-handedly, are provided. A cover is pivotally attached to a vehicle compartment floor (or to a base secured to a vehicle compartment floor) and is movable between a closed position in overlying, face-to-face relation with the floor and an open position wherein the cover is disposed substantially transverse to the floor. A wall is pivotally attached to the cover front side and is movable between a stored position in face-to-face relation with the cover front side and an operative position disposed substantially transverse to the base and to the cover. A spring is configured to urge the wall to a predetermined position when the cover is moved from a closed position to an open position. An elastic strap is secured to the cover and is configured to secure articles placed between the elastic strap and the cover.

20 Claims, 8 Drawing Sheets

COLLAPSIBLE STORAGE APPARATUS FOR VEHICLE CARGO COMPARTMENTS

FIELD OF THE INVENTION

The present invention relates generally to vehicles and, more particularly, to cargo management apparatus for use within vehicles.

BACKGROUND OF THE INVENTION

Motor vehicles are typically provided with a cargo storage compartment of some type. For example, sedan-style automobiles are conventionally equipped with a trunk. Sport/utility and mini-van vehicles, in which there are two or more rows of seating, are conventionally provided with a cargo storage area behind the last row of seating.

Items carried within vehicle cargo storage areas are often free to move about during vehicle operation, which may be undesirable. Cargo netting may be used to restrain items from movement within vehicle cargo storage compartments. While such netting may adequately restrain items from movement, cargo netting may require the use of two hands to hold the cargo netting back while placing items therewithin, which may be cumbersome.

Various devices are known for dividing vehicle storage compartments to prevent movement of items stored therein. For example, U.S. Pat. No. 6,027,155 to Wisniewski et al. describes a storage system for a vehicle cargo compartment that includes a cover that is removably attached to the floor of the cargo compartment and that is configured to rotate between open and closed positions. U.S. Pat. No. 5,669,537 to Saleem et al. describes a storage unit that extends between, and connects to, vehicle panels of a vehicle storage area. U.S. Pat. No. 5,501,384 to Wisniewski describes a storage system for a vehicle that includes a molded bin and a cover pivotally secured to the bin.

Unfortunately, these devices are somewhat complex and bulky and are not adapted to be compactly stored within vehicle cargo storage areas. Moreover, in automotive vehicles such as sport/utility vehicles and mini-vans, cargo storage space may be somewhat limited. Accordingly, a need exists for a cargo storage device that can securely retain items within a cargo storage area during operation of a vehicle and that can be easily stored in an out-of-the-way location when not needed, and without requiring that the storage device be removed from the cargo storage area. In addition, a need exists to maximize the efficiency and utilization of existing cargo storage space without intruding on passenger space.

SUMMARY OF THE INVENTION

In view of the above, apparatus for storing items within a vehicle compartment that can be operated single-handedly, are provided. According to embodiments of the present invention, a cover is pivotally attached to a vehicle compartment floor (or to a base secured to a vehicle compartment floor) and includes opposite front and rear sides and opposite first and second end portions. The cover is movable between a closed position wherein the front side is in overlying, face-to-face relation with the floor and an open position wherein the cover is disposed substantially transverse to the floor. A wall is pivotally attached to the cover front side and is movable between a stored position in face-to-face relation with the cover front side and an operative position disposed substantially transverse to the base and to the cover. A spring is configured to urge the wall to a predetermined position when the cover is moved from a closed position to an open position.

The wall includes an aperture formed therein. An elastic strap, which is secured to opposite end portions of the cover, passes through the wall aperture and is configured to secure articles placed between the elastic strap and the cover. The aperture includes a plurality of slots and the elastic strap can be selectably positioned within anyone of the slots to adjust for article size. The wall may also include one or more projection that is configured to support articles suspended therefrom.

According to another embodiment of the present invention, a cover is pivotally attached to a vehicle compartment floor (or to a base secured to a vehicle compartment floor) and includes opposite front and rear sides and opposite first and second end portions The cover is movable between a closed position wherein the front side is in overlying, face-to-face relation with the floor and an open position wherein the cover is disposed substantially transverse to the floor. A pair of walls are pivotally attached to the cover front side, and each wall is movable between a respective stored position in face-to-face relation with the cover front side and one or more operative positions disposed substantially transverse to the floor and to the cover. Each wall includes an aperture formed therein.

A pair of receptacles are formed within the base. Each wall includes a member that is configured to releasably engage one of the receptacles when moved to a predetermined position as a result of the cover being moved to an open position. A first spring urges one of the walls to a predetermined position when the cover is moved from a closed position to an open position. A second spring urges the other wall to a predetermined position when the cover is moved from a closed position to an open position.

An elastic strap, which is secured to opposite end portions of the cover, passes through the apertures in each wall and is configured to secure articles placed between the elastic strap and the cover. Each aperture includes a plurality of slots and the elastic strap can be selectably positioned within anyone of the slots to adjust for article size. Each wall may also include one or more projection that is configured to support articles suspended therefrom.

BRIEF DESCRIPTION OF THE DRAWINGS

FIG. 6A is a partial section view of the collapsible storage apparatus of FIG. 6 taken along lines 6A—6A.

DETAILED DESCRIPTION OF THE INVENTION

Figure 1:
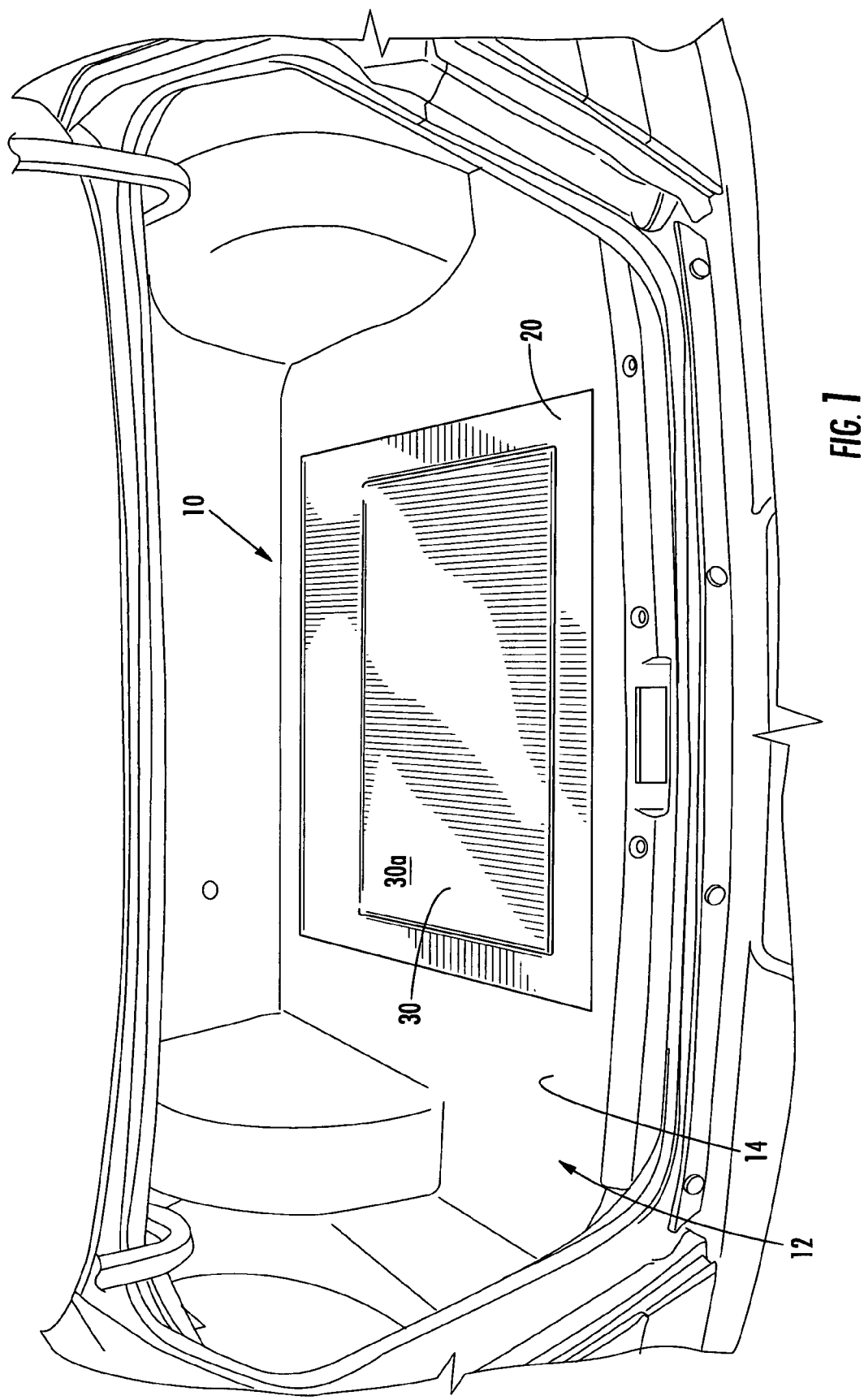
FIG. 1 is a perspective view of a collapsible storage apparatus for storing items within a vehicle compartment, according to embodiments of the present invention, wherein the apparatus is in a stored configuration.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. All publications, patent applications, patents, and other references mentioned herein are incorporated by reference in their entirety. As used herein, the term "and/or" includes any and all combinations of one or more of the associated listed items.

Referring to FIG. 1, a collapsible storage apparatus 10 for storing items within a vehicle compartment 12, according to embodiments of the present invention is illustrated. The illustrated vehicle compartment 12 is a trunk of an automobile. However, it is understood that embodiments of the present invention may be utilized in various compartments of various vehicles, such as the rear storage area of a mini-van, truck, and/or sport utility vehicle, without limitation. The illustrated vehicle compartment 12 includes a load floor (hereinafter "floor") 14. A floor covering (e.g., carpet, mat, etc.) may overlie floor 14, as would be understood by those skilled in the art.

The illustrated storage apparatus 10 includes a base 20 disposed on or at least partially below the floor 14. The base 20 has a surface 22 that is at least partially exposed to the vehicle compartment 12 when the apparatus 10 is in an operative (i.e., open) position (FIGS. 3–6). The base 20 may be disposed at or below any floor covering on the floor 14. The illustrated base 20 has a generally rectangular shape and may occupy less than the entire floor 14 of the vehicle compartment 12. However, the base 20 may have any size and shape (e.g., circular, oval, square, triangular, etc.) and can be positioned anywhere within a vehicle compartment 12. When the base 20 is disposed below a floor covering, the floor covering may include an opening such that at least a portion of the surface 22 is exposed to the vehicle compartment 12 when the apparatus 10 is in an operative (i.e., open) position. The base 20 may have a generally flat configuration and/or may have one or more portions thereof that have a sloped orientation relative to horizontal. For certain installations, the base 20 may conform to the configuration of a vehicle compartment (i.e., the base 20 may have a contour to match the contour of a portion of a vehicle compartment).

The illustrated storage apparatus 10 includes a cover 30 that is pivotally secured to the base 20 and is movable from a closed position (FIG. 1) overlying the base 20 to an open position extending substantially transverse to the base 20 (FIGS. 3–6). The illustrated cover 30 has a generally rectangular shape. However, the cover 30 may have any size and shape (e.g., circular, oval, square, triangular, etc.) and is not limited to the illustrated configuration.

According to other embodiments of the present invention, the floor 14 in a vehicle compartment 12 may serve the function of the base 20. Moreover, a floor covering overlying the floor 14 of a vehicle compartment 12 may serve the function of the base 20. As such, cover 30 may be pivotally attached to the floor 14 or to a floor covering overlying the floor 14 (and the cover 30 would be the only visible portion of apparatus 10 when the cover 30 is in a closed position). Thus, according to various embodiments of the present invention, base 20 may be a separate element or may be a vehicle compartment floor or a floor covering overlying a vehicle compartment floor.

Figure 2:
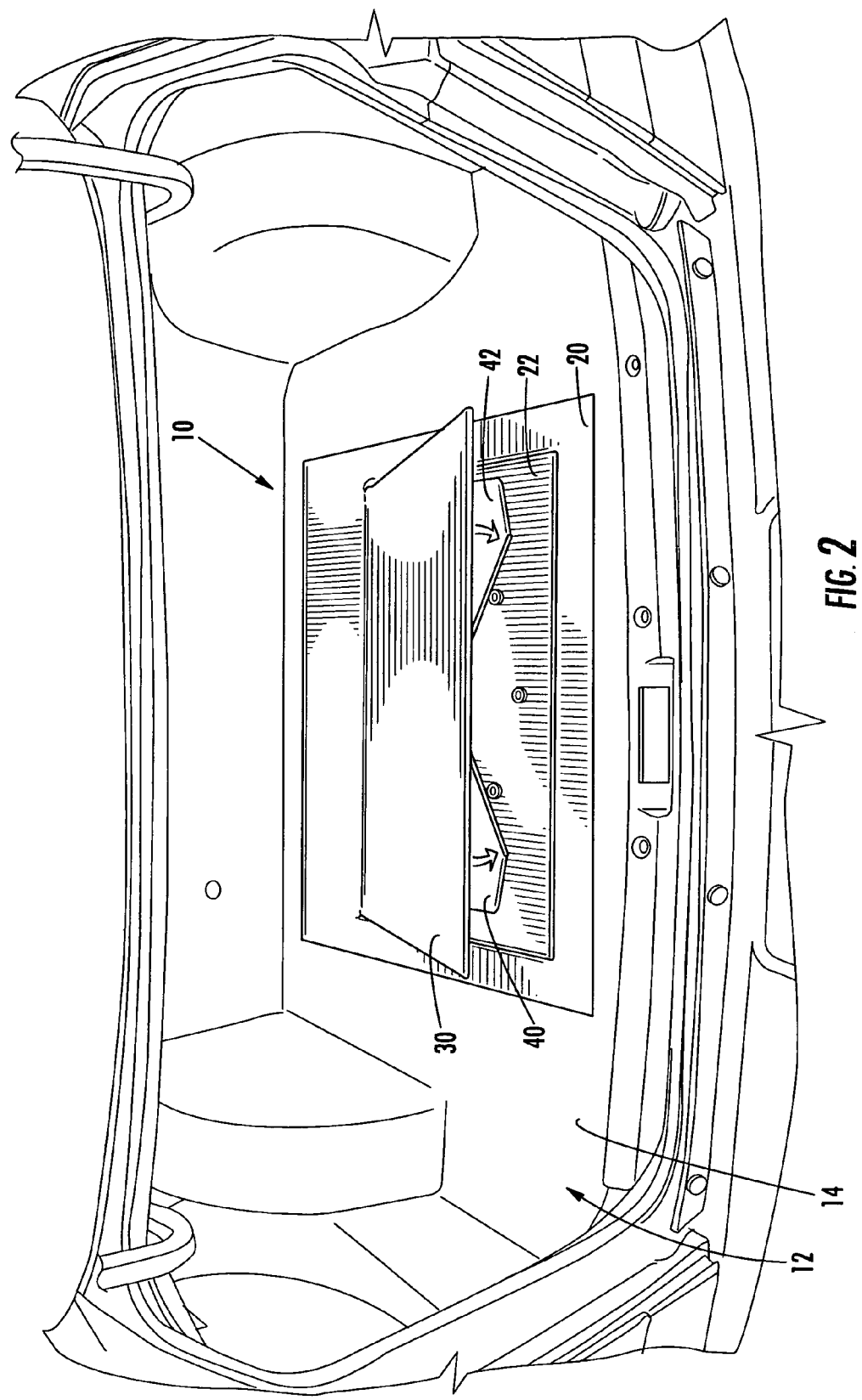
FIG. 2 is a perspective view of the collapsible storage apparatus of FIG. 1 wherein the apparatus is being moved to an operative position.
Figure 3:
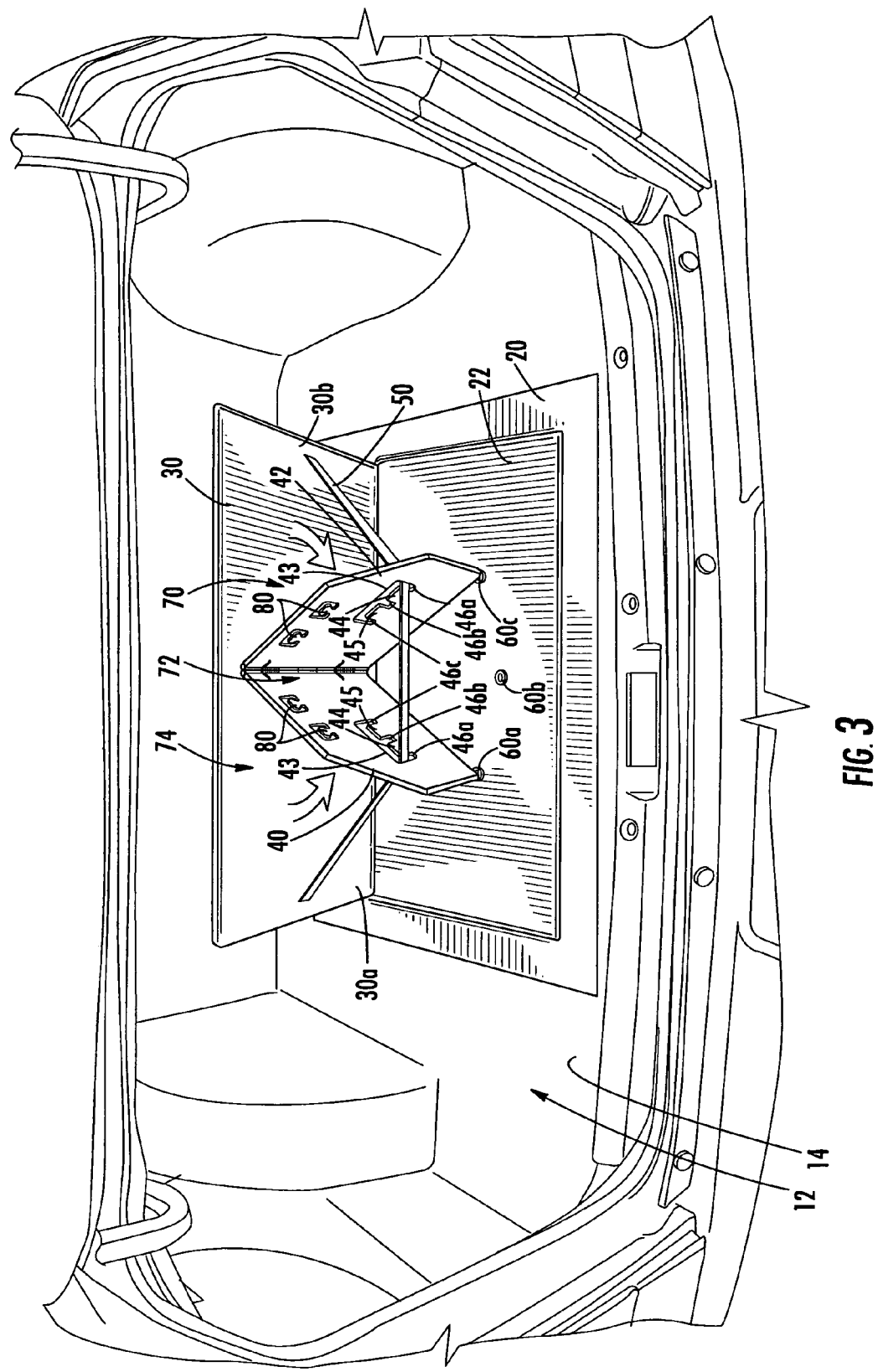
FIGS. 3–4 are perspective views of the collapsible storage apparatus of FIG. 1 in operative positions and wherein a pair of spring-loaded walls have automatically moved to respective operative positions to create storage areas for articles.

Referring to FIGS. 2–3, the illustrated apparatus 10 includes first and second spring-loaded partitions or walls 40, 42 that are pivotally secured to the cover 30 and that are movable from respective stored positions in adjacent, face-to-face relationship with the cover 30 and respective operative positions extending outwardly from the cover 30. The walls 40, 42 move automatically to respective operating positions when the cover 30 is raised from a closed position. An elastic strap 50 is secured to the cover 30 at opposite end portions 30*a*, 30*b*, as illustrated. The elastic strap 50 passes through a pair of respective apertures 43 in the first and second spring-loaded walls 40, 42, respectively, as illustrated.

A pair of projections 44, 45 extend within each respective aperture 43, as illustrated. These projections 44, 45 are configured such that the elastic strap 50 can be positioned within one of three slots formed by the hooks 44, 45 to accommodate articles of different sizes placed between the elastic strap and the cover 30. These slots are identified as 46*a*, 46*b*, 46*c*, with slot 46*a* being the "outer" slot, slot 46*b* being the "middle" slot, and slot 46*c* being the "inner" slot. Embodiments of the present invention are not limited to the illustrated configuration of apertures 43 and slots 46*a*–46*c*. Various numbers of slots may be utilized. Moreover, slots of different shapes and sizes may be utilized without limitation.

The illustrated base surface 22 includes first, second, and third depressions or receptacles 60*a*, 60*b*, 60*c*. Each receptacle 60*a*, 60*b*, 60*c* is configured to receive a pin 62 extending from a lower portion of the walls 40, 42 so as to removably secure the walls 40, 42 in respective positions relative to the cover 30 (FIG. 6A). Each pin 62 may be spring-loaded along its axial direction A to facilitate insertion into and release from the receptacles 60*a*, 60*b*, 60*c*, according to embodiments of the present invention. According to other embodiments of the present invention, pin 62 and/or wall 40, 42 may be configured to deflect slightly to permit insertion of pin 62 into one of the receptacles 60a, 60b, 60c. Each pin 62 is configured to engage and remain within a respective receptacle 60a, 60b, 60c against the biasing force of springs 49 (described below) that are used to automatically move the walls 40, 42 to respective operative positions.

Figure 7:
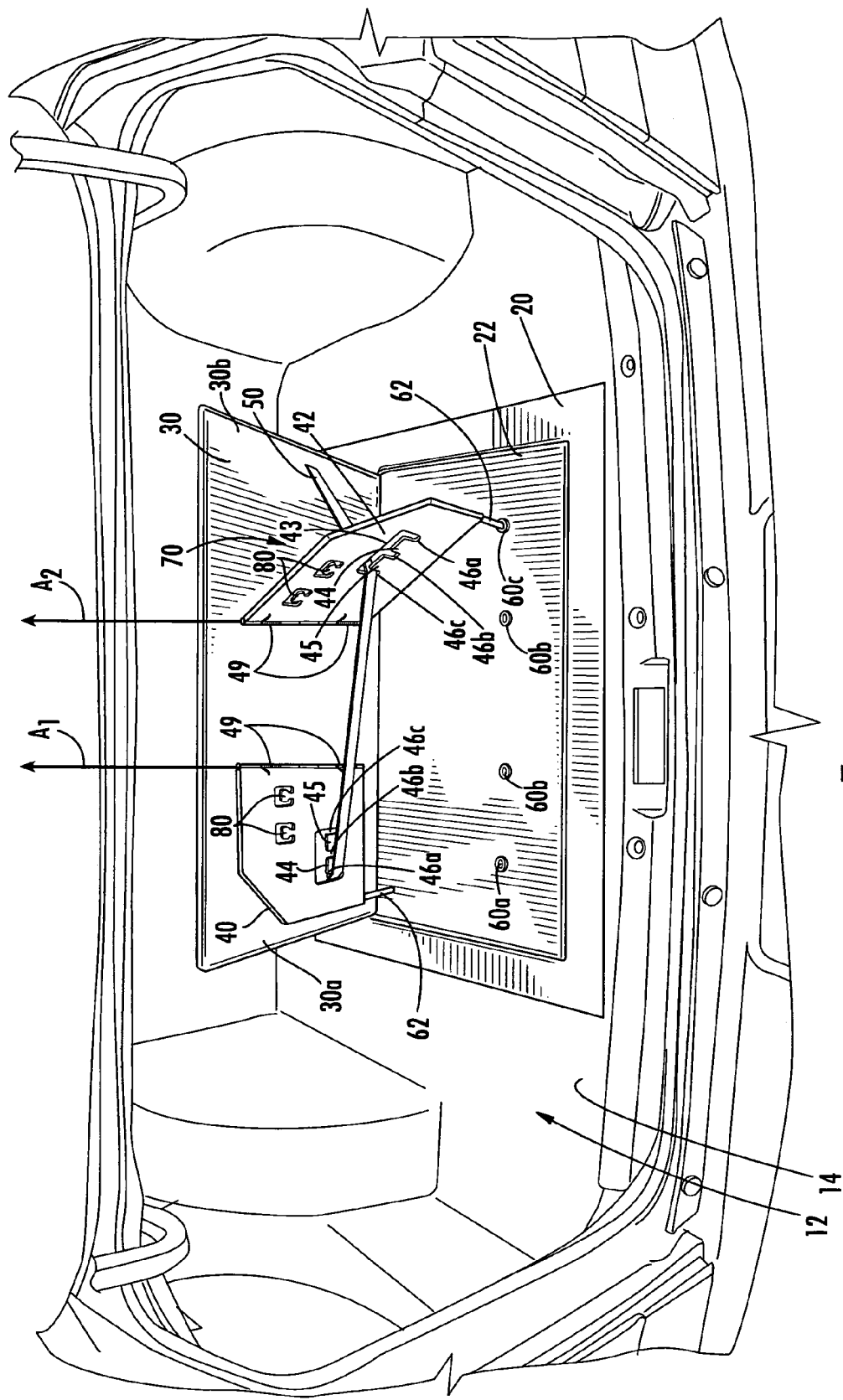
FIGS. 7 and 8 are perspective views of a collapsible storage apparatus for storing items within a vehicle compartment, according to other embodiments of the present invention.
Figure 8:
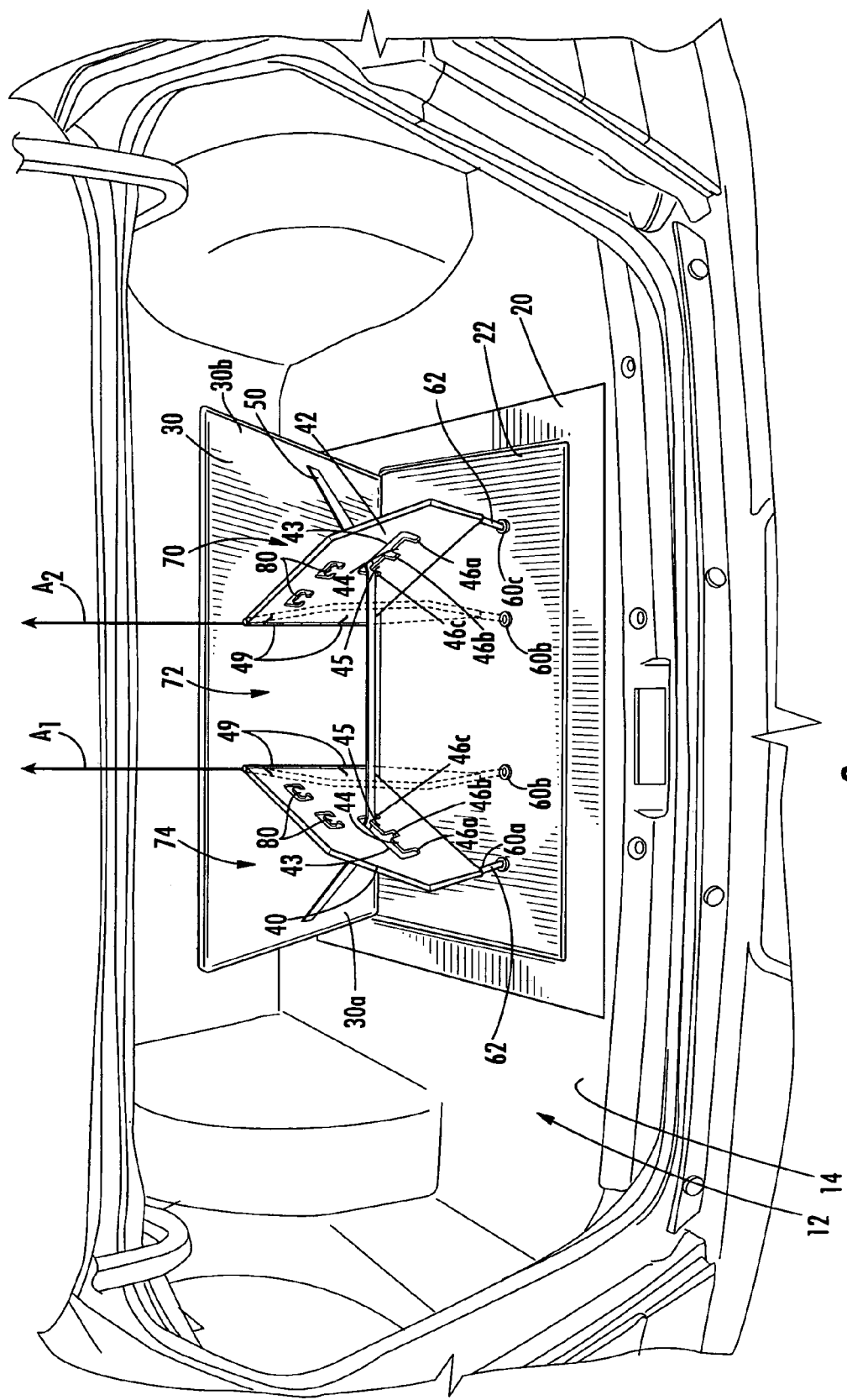

Pins 62 may have various shapes and configurations. For example, In FIGS. 7 and 8, pins 62 have an elongated configuration. Pins 62 may have non-linear configurations and are not limited to the illustrated linear embodiments.

Figure 4:
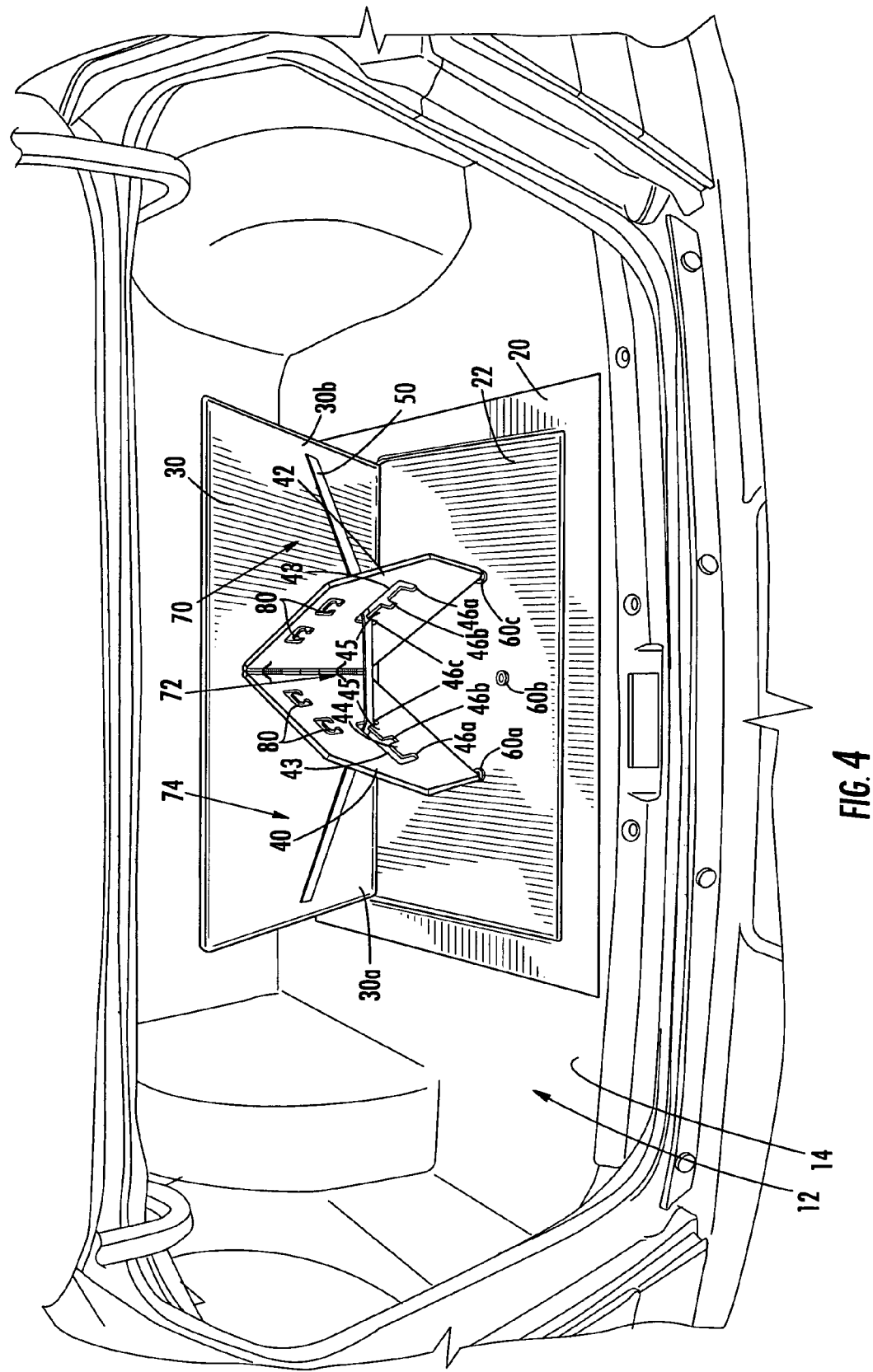
Figure 5:
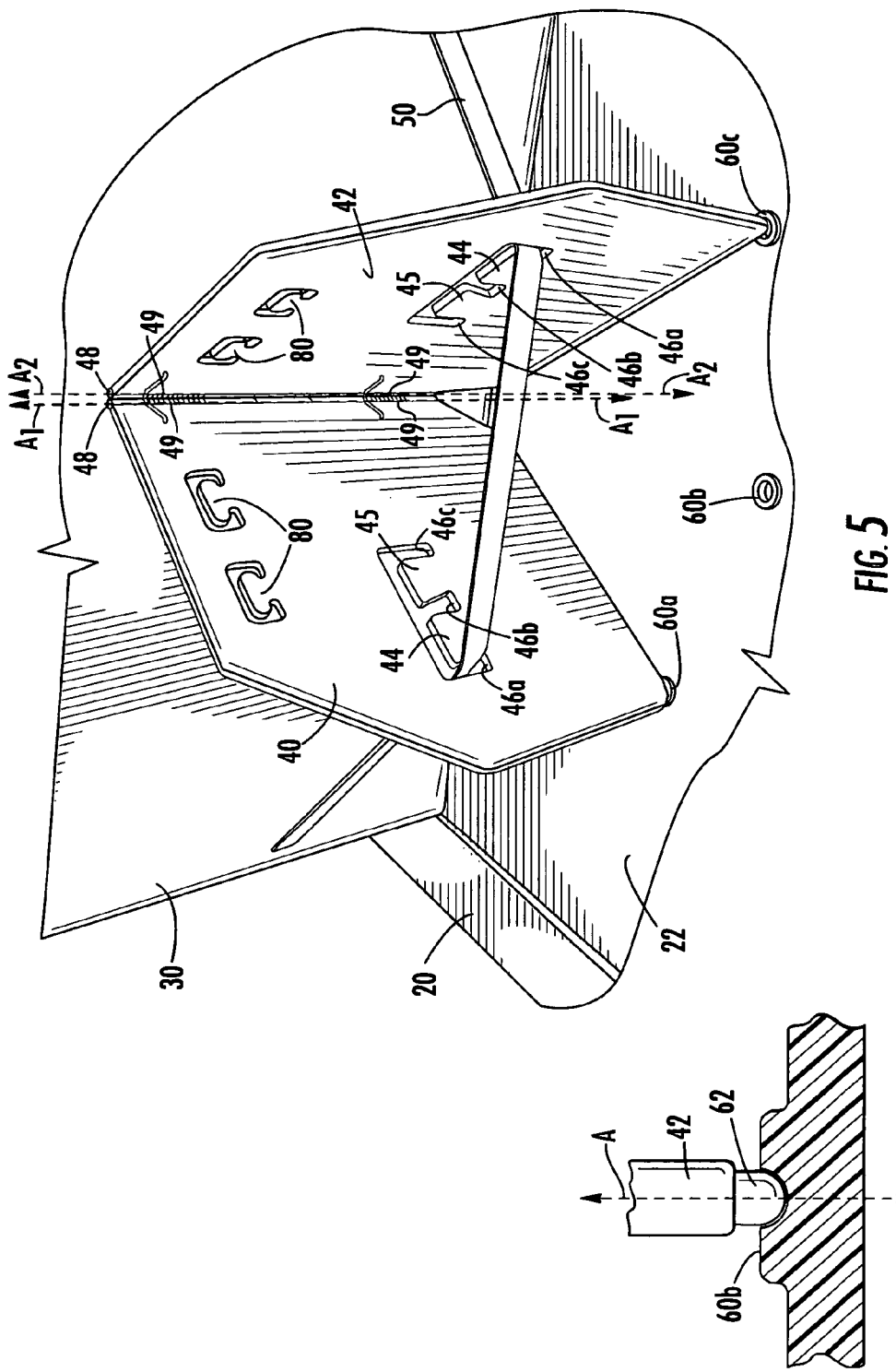
FIG. 5 is an enlarged perspective view of the apparatus of FIG. 3.
Figure 6:
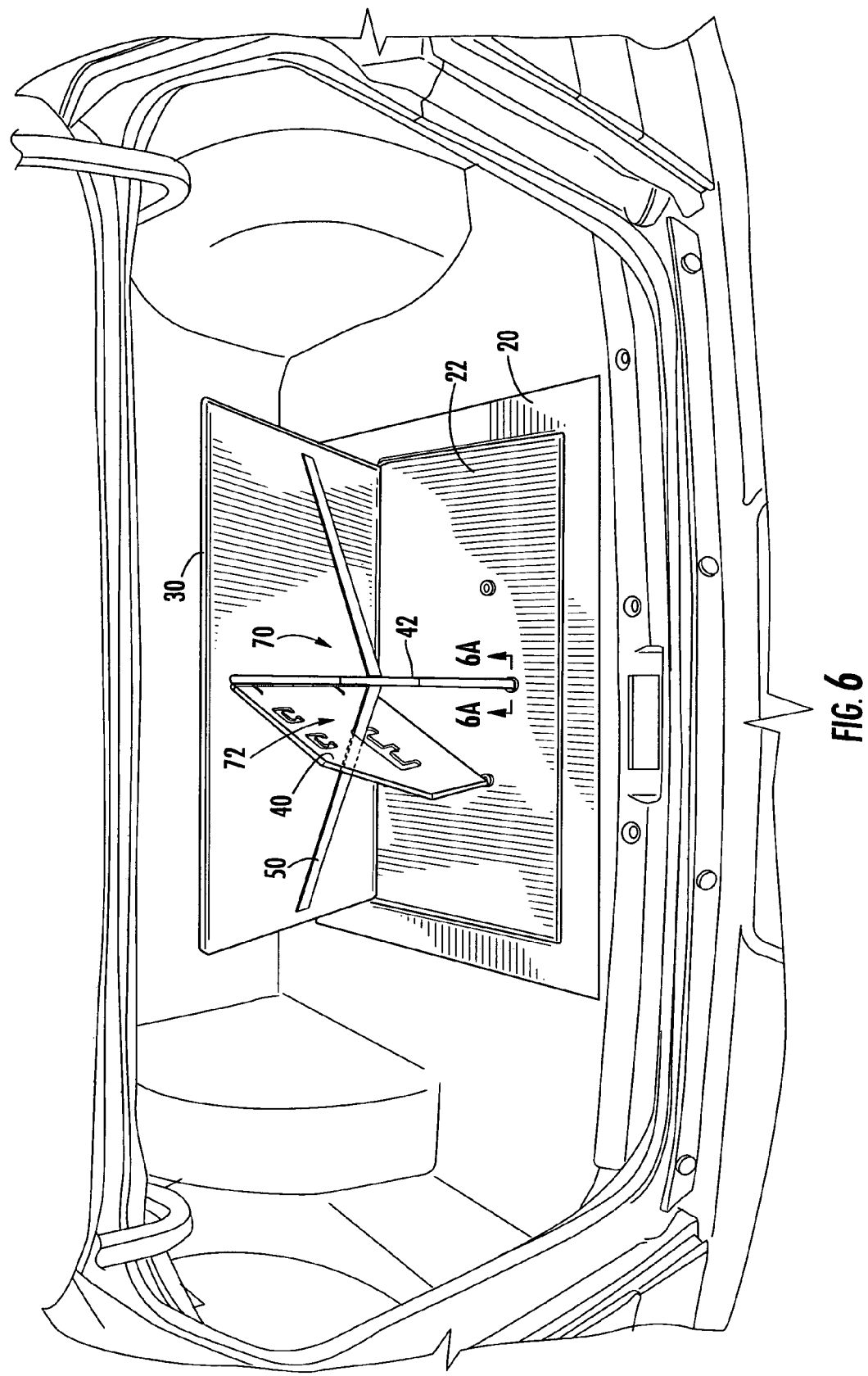
FIG. 6 is a perspective view of the collapsible storage apparatus of FIG. 3, wherein the second spring-loaded wall has been moved to a different position.

In FIGS. 3–5, spring-loaded walls 40, 42 are removably secured to the base 20 of the apparatus 10 in a position so as to form three compartments 70, 72, 74 for receiving cargo. In FIG. 3, the elastic strap 50 is positioned within the outer slots 46a to accommodate larger items within the compartments 70, 72, 74. In FIG. 4, the elastic strap 50 is positioned within the inner slots 46c to accommodate smaller items within the compartments 70, 72, 74. Elastic strap 50 may be positioned within the middle slots 46b, also. Moreover, the elastic strap 50 may be positioned within any combination of slots 46a–46c in walls 40, 42.

Each wall 40, 42 is pivotally secured to the cover 30 via a respective hinge 48 that facilitates pivotal movement of the walls 40, 42 about respective axes $A_1$, $A_2$. Any type and configuration of hinge may be utilized. In the illustrated embodiment, a pair of springs 49 are utilized to facilitate automatic movement of each wall 40, 42 to operative positions when the cover 30 is moved to an open position. Each spring 49 also permits a respective wall 40, 42 to return to a closed position in face-to-face relationship with the cover 30 when the cover 30 is moved to a closed position. In other words, the biasing force of each spring 49 can be easily overcome by the closure of cover 30 to thereby cause the walls 40, 42 to return to face-to-face relationship with the cover 30 as the cover 30 is moved to a closed position. The springs 49, thus, facilitate single-handed operation (i.e., opening and closing) of the storage apparatus 10.

The springs 49 may be adjustable such that walls 40, 42 move to predetermined positions. For example, the springs 49 for wall 40 may be configured such that wall 40 moves automatically to the position where pin 62 depending therefrom engages receptacle 60a. Alternatively, the springs 49 for wall 40 may be configured such that wall 40 moves automatically to the position where pin 62 depending therefrom engages receptacle 60b. Similarly, the springs 49 for wall 42 may be configured such that wall 42 moves automatically to the position where pin 62 depending therefrom engages receptacle 60c. Alternatively, the springs 49 for wall 42 may be configured such that wall 42 moves automatically to the position where pin 62 depending therefrom engages receptacle 60b.

In addition, walls 40, 42 may be moved manually by a user. The biasing force exerted by each spring 49 may be easily overcome by a user to facilitate adjustment of the positions of walls 40, 42 by a user.

A hinge (not shown) of virtually any type may be utilized to pivotally attach the cover 30 to the floor 14 (or to the base 20 or other vehicle component). According to embodiments of the present invention, a floor covering (e.g., carpeting) disposed on the floor 14 and on the rear side of the cover 30 may serve as a hinge for the cover 30. The base 20 may be disposed sufficiently beneath the floor 14 such that the cover 30 and any floor covering disposed thereon is substantially flush with the floor 14 when the cover 30 is in the closed position. Accordingly, the apparatus 10 may appear integral with a vehicle compartment floor 14 when the cover 30 is in the closed position.

However, it is to be understood that embodiments of the present invention need not be flush with a vehicle compartment floor or floor covering. Moreover, embodiments of the present invention may be configured to lie directly on top of a floor or floor covering. According to embodiments of the present invention, a handle (not illustrated) may be provided to facilitate movement of the cover 30 between open and closed positions.

In the illustrated embodiment, the walls 40, 42 include a plurality of hooks 80 in adjacent, spaced-apart relationship. Each hook 80 is configured to support one or more articles (e.g., shopping bags, etc.) suspended therefrom. Hooks 80 may have various shapes and configurations and are not limited to the illustrated embodiment. In addition, various numbers of hooks 80 may be utilized.

In the illustrated embodiments of FIGS. 1–6, walls 40, 42 pivot about respective axes $A_1$, $A_2$ that are adjacent. However, according to embodiments of the present invention illustrated in FIGS. 7 and 8, walls 40, 42 may pivot about respective axes $A_1$, $A_2$ that are spaced apart.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus for storing items within a vehicle compartment, wherein the vehicle compartment includes a floor, wherein a receptacle is formed within the floor, the apparatus comprising:

a cover pivotally attached to the floor and comprising opposite front and rear sides and opposite first and second end portions, wherein the cover is movable between a closed position wherein the front side is in overlying, face-to-face relation with the floor and an open position wherein the cover is disposed substantially transverse to the floor;

a wall pivotally attached to the cover front side and movable between a stored position in face-to-face relation with the cover front side and an operative position disposed substantially transverse to the floor and to the cover, and wherein the wall comprises a member that is configured to releasably engage the receptacle when the wall moves to the operative position; and a spring that biases the wall to a predetermined position when the cover is moved from the closed position to the open position.

2. The apparatus of claim 1, further comprising a second wall pivotally attached to the cover front side and movable between a stored position in face-to-face relation with the cover front side and an operative position disposed substantially transverse to the floor and to the cover; and a spring that biases the second wall to a predetermined position when the cover is moved from a closed position to an open position.

3. The apparatus of claim 1, wherein the wall comprises an aperture formed therein, and further comprising an elastic strap secured to opposite end portions of the cover, wherein the elastic strap passes through the wall aperture and is configured to secure articles placed between the elastic strap and the cover.

4. The apparatus of claim 3, wherein the aperture comprises a plurality of slots, and wherein the elastic strap can be selectably positioned within anyone of the slots.

5. The apparatus of claim 1, further comprising a base secured to the floor, and wherein the cover is pivotally attached to the base.

6. The apparatus of claim 5, wherein the base has a three-dimensional shape that conforms to a contoured shape of a portion of a vehicle compartment.

7. The apparatus of claim 1, wherein the wall comprises at least one projection that is configured to support one or more articles therefrom.

8. The apparatus of claim 7, wherein the at least one projection comprises a plurality of projections in adjacent spaced-apart relationship.

9. The apparatus of claim 1, wherein the cover is substantially flush with the floor when in the stored position.

10. An apparatus for storing items within a vehicle compartment, wherein the vehicle compartment includes a floor, the apparatus comprising:
    a cover pivotally attached to the floor and comprising opposite front and rear sides and opposite first and second end portions, wherein the cover is movable between a closed position wherein the front side is in overlying, face-to-face relation with the floor and an open position wherein the cover is disposed substantially transverse to the floor,
    first and second walls pivotally attached to the cover front side, wherein each wall is movable between a respective stored position in face-to-face relation with the cover front side and one or more operative positions disposed substantially transverse to the floor and to the cover, wherein each wall comprises an aperture formed therein;
    an elastic strap secured to opposite end portions of the cover, wherein the elastic strap passes through the apertures in each wall and is configured to secure articles placed between the elastic strap and the cover;
    a first spring that biases the first wall to a predetermined position when the cover is moved from a closed position to an open position; and
    a second spring that biases the second wall to a predetermined position when the cover is moved from a closed position to an open position.

11. The apparatus of claim 10, wherein first and second receptacles are formed within the floor, wherein the first wall comprises a member that is configured to releasably engage the first receptacle when the first wall is moved to a predetermined position, and wherein the second wall comprises a member that is configured to releasably engage the second receptacle when the second wall is moved to a predetermined position.

12. The apparatus of claim 10, wherein the aperture comprises a plurality of slots, and wherein the elastic strap can be selectably positioned within anyone of the slots.

13. The apparatus of claim 10, further comprising a base secured to the floor, and wherein the cover is pivotally attached to the base.

14. The apparatus of claim 13, wherein first and second receptacles are formed within the base, wherein the first wall comprises a member that is configured to releasably engage the first receptacle when the first wall is moved to a predetermined position, and wherein the second wall comprises a member that is configured to releasably engage the second receptacle when the second wall is moved to a predetermined position.

15. The apparatus of claim 13, wherein the base has a three-dimensional shape that conforms to a contoured shape of a portion of a vehicle compartment.

16. The apparatus of claim 10, wherein the first and second walls each comprise at least one projection that is configured to support one or more articles therefrom.

17. The apparatus of claim 16, wherein the at least one projection comprises a plurality of projections in adjacent, spaced-apart relationship.

18. The apparatus of claim 10, wherein tire cover is substantially flush with the floor when in the stored position.

19. The apparatus of claim 10, wherein the first and second walls are pivotally attached to the cover front side in adjacent relationship.

20. The apparatus of claim 10, wherein the first and second walls are pivotally attached to the cover front side in spaced-apart relationship.

* * * * *